United States Patent [19]

Goettsch

[11] Patent Number: 4,555,063

[45] Date of Patent: Nov. 26, 1985

[54] LIQUID WASTE AGITATING AND PUMPING APPARATUS

[75] Inventor: Michael R. Goettsch, Glenwood, Minn.

[73] Assignee: Glenwood Manufacturing Corporation, Glenwood, Minn.

[21] Appl. No.: 576,908

[22] Filed: Feb. 3, 1984

[51] Int. Cl.[4] .............................................. B02C 23/36
[52] U.S. Cl. .............................. 241/46.04; 241/46.17; 366/190; 366/264
[58] Field of Search ................. 366/190, 264; 241/98, 241/46.17, 185 A, 46 R, 46.04, 46.11, 46.17, 46.08, 46.06, 101.2, 101 B, 101 R; 417/360, 238, 239

[56] References Cited

U.S. PATENT DOCUMENTS

| | | | |
|---|---|---|---|
| 3,417,929 | 12/1968 | Secrest | 241/46.04 |
| 3,537,659 | 11/1970 | Vagedes | 241/101.2 X |
| 3,771,915 | 11/1973 | Back | 417/360 |
| 4,406,413 | 9/1983 | Houle | 241/46.04 |

Primary Examiner—Mark Rosenbaum
Attorney, Agent, or Firm—Kinney & Lange

[57] ABSTRACT

An improved liquid manure agitating and pumping apparatus for alternatively pumping and agitating liquid manure in a manure pit and including a housing having an impeller disposed therewithin and a motor situated on the housing for rotation of the impeller. The housing has an opening for fluidly communicating with the liquid manure in the pit and a discharge outlet. A sliding gate valve has a stationary guide plate with an opening in fluid communication with the discharge outlet and a sliding gate in sliding cooperation with the stationary guide plate. The sliding gate has a discharge pipe for connection with a suitable conduit to discharge the liquid manure out of the pit. A handle assembly is attached to the sliding gate for moving the sliding gate between a pumping position wherein the discharge outlet is in fluid communication with the discharge pipe and an agitating position wherein the discharge outlet is positioned for fluid communication with the manure in the pit.

5 Claims, 4 Drawing Figures

LIQUID WASTE AGITATING AND PUMPING APPARATUS

BACKGROUND OF THE INVENTION

1. Field of the Invention

The present invention relates to alternatively agitating and pumping liquid manure in a manure pit, and in particular, it relates to an improved agitating and pumping apparatus having a sliding gate valve which completely shuts off the flow of liquid manure out of the pit.

2. Description of the Prior Art

The storing of liquid manure in feed lot and dairy operations has become relatively common. The manure is allowed to flow to a pit wherein it is collected and stored until the operator or farmer is ready to dispose of the manure. For example, in a hog or dairy operation, the manure is stored in a pit during the winter months and is then removed from the pit and spread out on the fields prior to plowing.

The manure is substantially in a liquid form that contains solids that eventually settle out onto the bottom of the pit or float on top of the liquid. It is necessary first to agitate the liquid manure into a substantially uniform slurry before discharging the manure from the pit. In addition, the manure also contains other items and matter which have been carried into the manure pit which cause problems in discharging the manure. These items and other matter include straw from bedding, hay, twine, rags and even rubber gloves used to perform artificial insemination. Many of these items are not ground into small particles by the pump. Prior art agitating and discharge pumps have had operating problems when these other items have been taken in by the pump and discharged in only a partially-ground condition.

For example, in using prior art pumping apparatus that both agitates the liquid manure into a substantial slurry and discharges the slurried manure, the other items have clogged the valve that is used to close the discharge flow, resulting in the liquid manure leaking on the ground, causing a mess.

One example of a manure handling system is described in the Kellogg U.S. Pat. No. 3,367,583. The manure handling system includes a liquid storage tank for holding the liquid manure, a pump unit disposed near one side wall of the tank, and a rotatable hydraulic jet unit disposed centrally within the tank. The jet unit and the pump unit are connected by a transfer conduit which is fitted at both ends with quick detachable joints so that the unit can either connect the pump to the jet unit or the pump to a discharge tank and trailer unit. When the manure is being recirculated, the manure is required to flow up and out of the tank through conduit which can have obvious disadvantages in the wintertime.

The Vaughan U.S. Pat. No. 3,316,843 describes a tank sump pump having a discharge end which communicates with a vertically disposed conduit. A swinging-type flapper valve is positioned at an upper end of the conduit to determine whether the material being pumped is recirculated or flows through a discharge pipe to a suitable receptacle. A swinging-type flapper valve has the disadvantage that solid material can get wedged between the flapper portion of the valve and its seat. In addition, the sump pump includes a standard gate valve for permitting manure to be recirculated in the pit. The valve is actuated from an open to a closed position by a conventional screw mechanism. Again, solid material can get caught on the gate portion of the valve and on the valve seat such that the valve will not seat properly, letting material discharge into the tank instead of up through the vertical conduit.

The Wolford U.S. Pat. No. 4,145,008 describes a centrifugal pump for disintegrating solids contained in the waste material to convert solid or semi-solid waste material to a pumpable slurry. The pump of the Wolford Patent is not designed to recirculate the waste material within the tank.

The Erlitz U.S. Pat. No. 3,948,450 describes a liquid manure pump that swings the pump discharge pipe out of engagement with the pump so that the manure recirculates within the tank. The discharge pipe has a nipple which acts as a stop to aligh the discharge pipe for connection. If solid matter gets caught on the nipple, the discharge pipe will not be properly aligned.

SUMMARY OF THE INVENTION

The present invention includes an improved liquid waste agitating and pumping apparatus for alternatively pumping and agitating liquid waste stored in a waste pit. The apparatus includes an impeller housing with an impeller and a motor mounted on the housing to provide motive force to rotate the impeller. The housing has an inlet for fluid communication with the liquid waste in the pit and a discharge outlet. A sliding gate valve is attached to the outlet of the housing. The sliding gate valve includes a stationary guide plate member having an opening in fluid communication with the discharge outlet and fixedly attached to the housing and a sliding gate member in sliding cooperation with the stationary guide plate member. The sliding gate member has a discharge pipe with a fluid passage that is adapted for engagement with a discharge conduit for discharge out of the waste pit. A handle assembly extends out of the pit and is attached to the sliding gate member to acutate movement of the sliding gate member between a pump position wherein the outlet is in fluid communication with the fluid passage of the discharge pipe and in an agitating position wherein the sliding gate member is completely removed from communication with the opening of the stationary guide member and the outlet of the housing is placed in fluid communication with the interior of the pit.

DETAILED DESCRIPTION OF THE PREFERRED EMBODIMENTS

Figure 1:
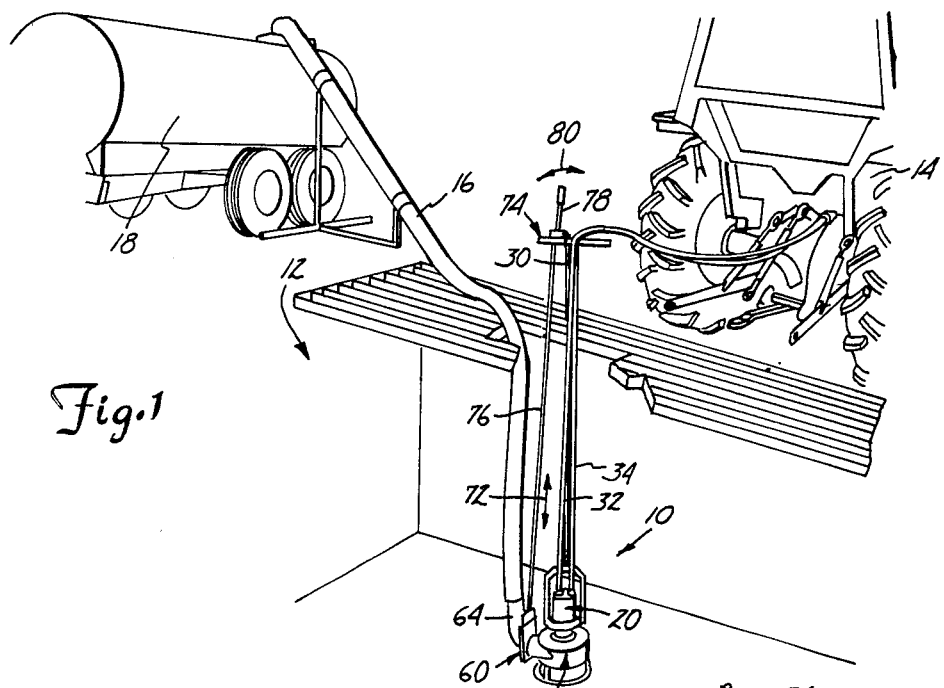
FIG. 1 is a perspective view of the present invention in use pumping waste manure out of a pit.

The present invention includes an agitating and pumping apparatus, generally indicated at 10 in FIG. 1, that is used for pumping liquid waste, such as manure, stored in a containment area such as pit 12. The pit 12 generally contains a large quantity of liquid manure that has been stored for a considerable length of time, such as over the entire winter in a hog or dairy farm operation. During storage, heavier solid matter settles out on the bottom of the pit while lighter solid matter accumulates as a top layer on the liquid. In addition, other matter, such as straw, twine, rags or rubber gloves, which has dropped into the pit along with the manure, may be found at various levels. In order to pump the stored manure out of the pit, the contents of the pit must be converted into a substantially uniform slurry. The other matter in the pit has long been a problem in trying to convert the manure into a slurry and in trying to pump the slurried manure out of the pit.

Figure 2:
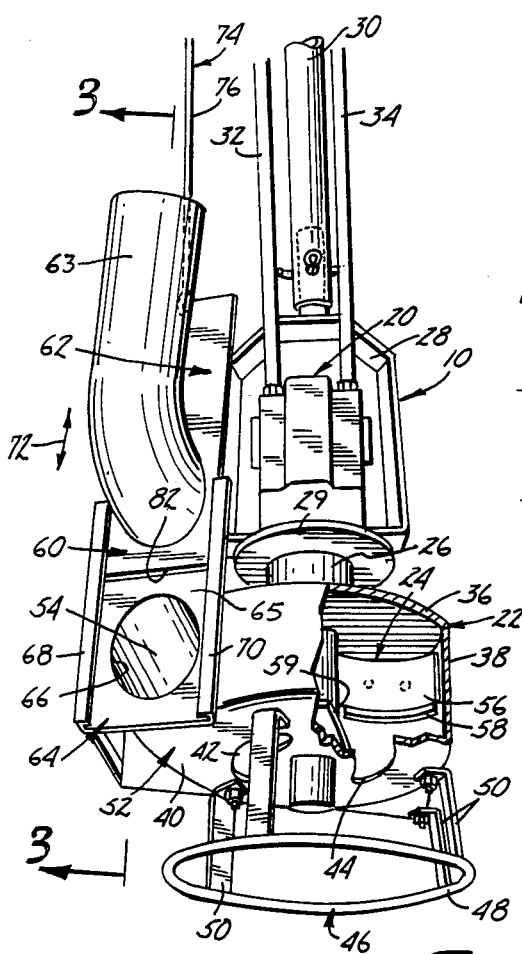
FIG. 2 is a perspective view, with portions broken away, of the agitating and pumping apparatus of the present invention.

Referring to FIG. 2, the apparatus 10 preferably includes a conventional hydraulic motor 20 mounted on a bearing housing 26 which is mounted on an impeller housing 22. The impeller housing 22 has an impeller 24 that is rotatably connected to the hydraulic motor 20 through a shaft assembly (not shown). The hydraulic motor 20 receives hydraulic fluid under pressure from a tractor 14 for alternatively agitating and pumping the liquid manure out of the pit 12 through a discharge conduit 16, for example, into a tank truck 18. Although a hydraulic motor is preferred, other motors powered by other energy sources, such as an electric motor, are within the scope of the present invention.

A bracket 28 having a generally U-shaped configuration is fixedly attached to a plate portion 29 of the bearing housing 26 at a lower end and extends upwardly over the hydraulic motor 20. A suitable extension pole 30 is attached to a top portion of the bracket 28 and is used to lower the apparatus 10 into the pit 12, as illustrated in FIG. 1. Hydraulic tubing 32 and 34 deliver hydraulic fluid under pressure to the motor 20 from the hydraulic supply of the tractor 14 or other hydraulic source, and to return the fluid back to the tractor. There are suitable conventional detachable connections between the tubing 32 and 34 and the tractor 14.

The housing 22 includes a solid upper wall plate portion 36, a solid side wall portion 38 and a bottom wall portion 40 which define an interior cavity that the impeller 24 is positioned in, as illustrated in FIG. 2. The bottom wall portion 40, which may be formed integrally with the side wall portion 38, includes manure inlets 42 and 44 that place the interior cavity of the housing 22 in fluid communication with the liquid manure in the pit 12.

A stand, generally indicated at 46, includes a bottom ring portion 48 and a plurality of legs 50 that are attached at their upper ends to the bottom wall portion 40. The ring 48 is spaced from the bottom wall portion 40 so that the inlets 42 and 44 are spaced a sufficient distance from the floor of the pit 12 so that the liquid manure has a substantially unrestricted flow path into the cavity of the housing 22.

The impeller 24 rotates about a substantially vertical axis within the cavity of the housing 22. The impeller 24 includes a plurality of impeller blades 56. The impeller blades 56 are used to both pump the liquid manure through the housing 22 and to reduce the size of the solid matter in the manure to form a suitable slurry. To reduce the size of the matter, each blade 56 has a detachable knife 58 which cooperates with a stationary knife blade 59. The stationary knife blade is suitably attached, such as with bolts (not shown) to an inner surface of the bottom wall portion. The blades 56 and stationary blade 59 shear and cut solid matter, such as rags or rubber gloves, that are drawn into the cavity of the housing 22.

The liquid manure and other matter is discharged from the housing 22 through a jet-type discharge 52 having a discharge chamber 54. The discharge chamber 54 is disposed in a generally horizontal position with respect to the vertical axis of rotation of the impeller.

Figure 3:
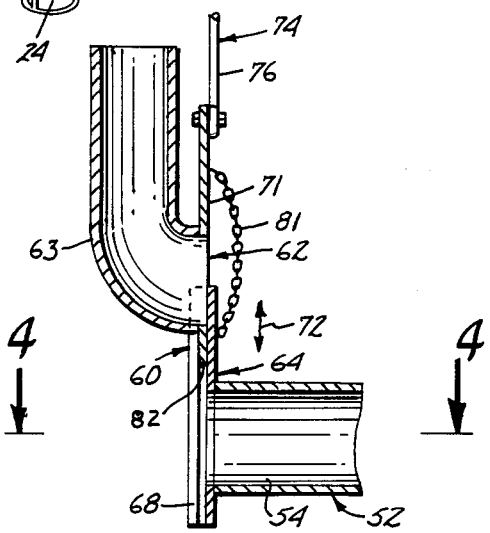
FIG. 3 is a cross-sectional view of the discharge of the housing, with the sliding gate valve in an open or agitating position, taken along the line 3—3 in FIG. 2.
Figure 4:
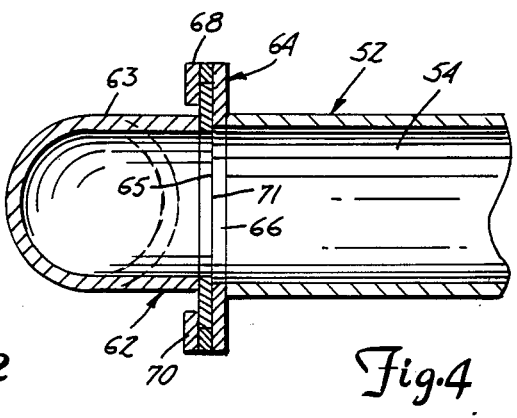
FIG. 4 is a cross-sectional view of the discharge end of the housing taken along the line 4—4 in FIG. 3 with the sliding gate valve in a closed or discharge position.

A sliding gate valve 60 includes a sliding gate valve plate member 62 and stationary guide plate member 64, as illustrated in FIGS. 2-4. The stationary guide member 64 has a substantially flat surface 65 and is mounted directly to the discharge unit 52. The guide member 64 includes an opening 66 that communicates with the chamber of the discharge unit 52. The stationary guide member 64 includes left and right guide tabs 68 and 70, respectively, which, along with surface 65, are positioned in a plane substantially normal to the flow of the liquid manure from the discharge unit 52.

The sliding gate member 62 includes a discharge pipe 63 that is connectable with the discharge conduit 16, as illustrated in FIG. 1. The sliding gate member 62 also has a substantially flat surface 71 that cooperates with the substantially flat surface 65 of the stationary gate member 64, as best illustrated in FIGS. 3 and 4. The gate member 62 engages guide tabs 68 and 70 so that the sliding gate member 62 slides along in the general direction indicated by arrow 72 with the surfaces 65 and 71 cooperating to form a seal when the valve is in a discharge mode.

A handle assembly 74 is attached to the sliding gate member through a lower extension rod 76, as illustrted in FIGS. 1-3. The handle assembly 74 actuates the sliding gate member 62 along the generl direction of arrow 72 through a lever 78 in the general direction of arrow 80, as illustrated in FIG. 1. The handle 78 and the extension rod 76 are connected to each other by a conventional linkage (not explicitly shown). In addition, a chain 81 is attached at one end to the stationary guide member 64 and at another end to the sliding gate member 62 and is of a length that prevents the sliding gate member from being pulled out of the guide tabs 68 and 70.

In use, the apparatus of the present invention is used to both agitate and pump liquid manure stored in the pit. The present invention provides both an apparatus that agitates and reduces solid matter in the manure into a substantial slurry and which acts as a pump to discharge the slurried manure out of the pit and into the tank truck or a pumping system.

The apparatus is switched from an agitating mode to a pumping mode in a simple manner by actuating the sliding gate valve. The sliding gate valve offers no areas wherein solid matter can catch during discharge such that the operation of the valve is affected. Consequently, when the apparatus is placed in an agitating mode, there is no leakage of slurried manure up through the discharge pipe 63 and conduit 16. The sliding gate valve member, in effect moves the discharge pipe 60 out of connection with the discharge unit 52.

To actuate the sliding gate valve 60, the handle 78 is pulled as indicated by arrow 80 in FIG. 1, and the sliding gate valve is moved in an upward direction, as indicated by arrow 72. When the sliding gate member 62 is in an upward position, the apparatus 10 is in the agitating mode. The sliding gate member is pulled by the handle assembly 78 so that a lower edge 82 of the gate valve member 62 is positioned above the uppermost portion of the opening 66 and the discharge chamber 54.

With the lower edge 82 above the discharge chamber 54 and opening 66, there is no place for solid matter to get hung up or caught during the agitation mode so that it would affect the actuation of the valve 60.

To place the apparatus in a pumping or discharge mode, the handle 78 is pushed in an opposite direction, as indicated by arrow 80, and the sliding gate member is moved downwardly, in the general direction of arrow 72, so that the discharge pipe 63 is placed in fluid communication with the discharge chamber 54 and the discharge opening 66. If there is solid matter around the opening, the lower edge 82 will act as a knife to move through the solid matter and along with the substantially flat surfaces 65 and 71, will prevent any solid matter to come between the sliding gate member and the stationary guide member and affecting the operation of the valve.

Although the present invention has been described with reference to preferred embodiments, workers skilled in the art will recognize that changes may be made in form and detail without departing from the spirit and scope of the invention.

What is claimed is:

1. An improved liquid waste agitating and pumping apparatus for pumping and agitating liquid waste contained in an enclosure, the apparatus comprising:

an impeller housing having an inlet for fluid communication with the liquid waste in the enclosure and an outlet for discharge of the liquid waste out of the housing;

impeller means disposed within the housing;

motor means mounted on the housing for rotation of the impeller means and including a shaft assembly connected to the impeller for rotation thereof;

sliding gate valve means externally mounted with respect to the impeller housing, having a stationary guide plate with an opening in fluid communication with the outlet of the housing, fixedly attached to the housing, and a sliding gate member in sliding cooperation with the stationary guide plate and having a discharge conduit means with a fluid passage for discharging the liquid waste from the enclosure, the sliding gate member being slidable between a pump position wherein the opening of the stationary guide plate is positioned for fluid communication with the fluid passage of the discharge conduit and an agitating position wherein the opening of the stationary guide plate is in direct fluid communication with the liquid waste contained in the enclosure and the lowermost portion of the sliding gate member is above the uppermost portion of the opening of the stationary guide plate; and handle means attached to the sliding gate member for moving the sliding gate member between the pumping position and the agitating position.

2. The apparatus of claim 1 wherein the impeller means includes a plurality of blades with knives disposed thereon and further includes a stationary knife surface defined within the housing, generally perpendicularly aligned to the axis of rotation of the impeller means such that solid matter entering the housing through the inlet is sheared by the blades of the impeller against the stationary blade of the housing.

3. The apparatus of claim 1 wherein the stationary guide plate includes first and second guide means which cooperate with the sliding gate member keeping the sliding gate member in sliding cooperation with the stationary guide plate.

4. The apparatus of claim 1 and further including stand means attached to a lowermost portion of the housing for spacing the inlet of the housing from a surface of the liquid waste contained in an enclosure a distance that substantially prevents restriction of flow into the inlet.

5. The apparatus of claim 1 wherein the motor means includes a hydraulic motor.

* * * * *